Patented June 11, 1929.

1,717,023

UNITED STATES PATENT OFFICE.

WILLIAM F. GOWELL, OF AUGUSTA, MAINE.

FILLER AND POLISHING COMPOSITION.

No Drawing. Application filed February 25, 1926. Serial No. 90,691.

This invention relates to an improved filler and polishing composition adapted for use generally as a wood finish, and for finishing floors, furniture, linoleum, oilcloth, automobile bodies and tops, etc.

The primary object of the invention is to provide a composition of the above kind which will be extremely efficient in use, which may be utilized without the requirement of special skill or implements and which may be readily manufactured at a minimum expense.

I have found that the composition will give most satisfactory results when composed of the following ingredients in substantially the proportions of:

Turpentine, 1 gallon; paraffin wax, ½ pound; litharge, 1 pound; ammonia, 1 ounce; citronella ¼ of an ounce.

In preparing the composition, the turpentine or any equivalent turpentine substitute, is heated to the boiling point, whereupon the paraffin wax and litharge are added. This solution is allowed to boil approximately thirty minutes, and then the ammonia and citronella are added, whereupon the composition is ready for use.

Ordinary household ammonia or water of ammonia is employed, and in applying the composition to the surface, this ammonia acts to loosen dirt and other foreign matter so that its removal is insured when the surface is rubbed, and so that the remaining ingredients properly adhere to the cleaned surface for having the desired effective finishing or filling and polishing effect thereon. The turpentine acts as a thinner, the oil contained therein having a polishing value, and the resin contained therein having value as a filler. In a like manner, the paraffin wax, besides acting generally as a waterproofing preservative, contains oil having a polishing value and a body having a filler value. The litharge, besides constituting a coloring pigment, acts in connection with the wax to provide the cleaned surface with a durable and highly attractive finish. While oil of citronella is preferably used, it is apparent that a suitable quantity of another kind of perfume may be used is desired.

I am aware of the fact that the above ingredients, individually, have been employed for similar uses, and also that some of the same have been used in combination with each other. However, I have found from experiments that when substantially all of the ingredients are used together in substantially the proportions set forth a most effective composition is had.

Having thus described my invention, what I claim as new is:—

A wood filling and polishing composition of the character described, comprising a mixture of the following ingredients in substantially the following proportions:

Turpentine _____ 1 gallon
Paraffin wax _____ ½ pound
Litharge _____ 1 pound
Ammonia _____ 1 ounce In testimony whereof I affix my signature.

WILLIAM F. GOWELL.